United States Patent [19]

Onishi

[11] Patent Number: 5,468,805
[45] Date of Patent: Nov. 21, 1995

[54] ROOM-TEMPERATURE-CURABLE ORGANOPOLYSILOXANE COMPOSITION METHOD FOR ITS PREPARATION

[75] Inventor: Masayuki Onishi, Chiba Prefecture, Japan

[73] Assignee: Dow Corning Toray Silicon Co., Ltd., Tokyo, Japan

[21] Appl. No.: 230,663

[22] Filed: Apr. 21, 1994

[30] Foreign Application Priority Data

May 18, 1993 [JP] Japan .................... 5-139333

[51] Int. Cl.$^6$ ............................................. C08L 83/06
[52] U.S. Cl. ................ 524/731; 524/863; 525/477; 525/478; 528/34; 528/24; 528/31; 528/32
[58] Field of Search ................... 524/731, 863; 525/477, 478; 528/34, 24, 31, 32

[56] References Cited

U.S. PATENT DOCUMENTS

| | | | |
|---|---|---|---|
| 4,034,140 | 7/1977 | Przybyla | 428/447 |
| 4,221,693 | 9/1980 | Getson et al. | 528/34 |
| 4,614,760 | 9/1986 | Homan et al. | 524/860 |
| 4,711,928 | 12/1987 | Lee et al. | 524/860 |
| 4,754,013 | 6/1988 | Antonen | 528/15 |
| 4,778,860 | 10/1988 | Morita et al. | 525/431 |
| 4,853,434 | 8/1989 | Block | 525/100 |
| 5,051,311 | 9/1991 | Popa et al. | 428/447 |
| 5,091,484 | 2/1992 | Colas et al. | 525/477 |

FOREIGN PATENT DOCUMENTS 247756  11/1986  Japan .
252456  11/1987  Japan .

OTHER PUBLICATIONS

Hawley's Condensed Chemical Dictionary, 12th ed. p. 1141.

*Primary Examiner*—David Buttner
*Assistant Examiner*—Margaret W. Glass
*Attorney, Agent, or Firm*—Roger H. Borrousch

[57] ABSTRACT

The introduction of a room-temperature-curable organopolysiloxane composition that exhibits tack during the course of its cure and that forms a cured product strongly adherent to a variety of substrates when cured while in contact with substrate. Also, the introduction of a method for the preparation of this room-temperature-curable organopolysiloxane composition.

20 Claims, No Drawings

ROOM-TEMPERATURE-CURABLE ORGANOPOLYSILOXANE COMPOSITION METHOD FOR ITS PREPARATION

BACKGROUND OF THE INVENTION

1. Technical Field

The present invention relates to a room-temperature-curable organopolysiloxane composition and to a method for its preparation. More specifically, the present invention relates to a room-temperature-curable organopolysiloxane composition that exhibits tack during the course of its cure and that forms a cured product strongly adherent to a variety of substrates when cured while in contact with substrate. The present invention also relates to a method for the preparation of this composition.

2. Prior Art

Many room-temperature-curable organopolysiloxane compositions can be stored for long periods of time in the absence of moisture and cure at room temperature in the presence of moisture. Moreover, when cured while in contact with asubstrate, they form a cured product that adheres to a variety of substrates. As a result of these attributes, they are used as adhesives, sealants, and coatings in construction and industry, for electrical and electronic instruments and devices, and so forth.

Such room-temperature-curable organopolysiloxane compositions are exemplified by the following:

(i) a room-temperature-curable organopolysiloxane composition comprised of organopolysiloxane that contains at least 2 silicon-bonded alkoxy groups in each molecule, surface-treated silica, alkoxysilane or partial hydrolysis condensate thereof, and titanium chelate catalyst as shown by Japanese Patent Application Laid Open [Kokai or Unexamined] Number Sho 61-247756 [247,756/1986], published November 5, 1986;

(ii) a room-temperature-curable organopolysiloxane composition comprised of organopolysiloxane that contains at least 2 trialkoxysilyl groups in each molecule, surface-treated silica, alkoxysilane or partial hydrolysis condensate thereof, and titanium chelate catalyst as shown by Japanese Patent Application Laid Open Number Sho 62-252456 [252,456/1987], published Nov. 4, 1987; and (iii) a room-temperature-curable organopolysiloxane composition comprised of polydiorganosiloxane endblocked at both molecular chain terminals with the alkoxysilylethyl group, surface-treated reinforcing filler, alkoxysilane, and titanium catalyst as shown by Lee et al in U.S. Pat. No. 4,711,928, issued Dec. 8, 1986.

The following are exemplary of attempts at improving the adherence of room-temperature-curable organopolysiloxane and the physical properties of the cured product:

(iv) a curable organopolysiloxane composition comprised of the combination of a room-temperature-curable organopolysiloxane composition comprising a silanol-endblocked organopolysiloxane plus organotriacetoxysilane and a free radical reaction-curing organopolysiloxane composition comprising an organopolysiloxane plus an organoperoxide as shown by Przybyla in U.S. Pat. No. 4,034,140, issued Jul. 5, 1977, and (v) a room-temperature-curable organopolysiloxane composition comprised of silanol-endblocked polydiorganosiloxane, amidosilane, and organoperoxide as shown by Homan et al in U.S. Pat. No. 4,614,760, issued Sep. 30, 1986.

However, these room-temperature-curable organopolysiloxane compositions cure from the section in contact with atmospheric moisture. Due to this, when such compositions are used to bond adherends, transport or other handling of the bonded assembly prepared from the adherends can cause slippage or displacements in the bonding position of the adherends, as well as, delamination. As a result, in order to prevent slippage or delamination due to transport or other handling of the bonded assembly, there is demand for a room-temperature-curable organopolysiloxane composition that exhibits tack during the course of its cure. This demand is particularly strong with regard to the continuous bonding of electrical or electronic components to substrates.

SUMMARY OF THE INVENTION

The present invention takes as its object a room-temperature-curable organopolysiloxane composition that exhibits tack during its cure and that forms a cured product strongly adherent to a variety of substrates when cured while in contact with the substrate. A method for the preparation of said room-temperature-curable organopolysiloxane composition is an additional object of the present invention.

This invention relates to a room-temperature-curable organopolysiloxane composition comprising (A) 100 weight parts organopolysiloxane that contains at least 2 silicon-bonded alkoxy groups in each molecule and that has a viscosity at 25° C. of 0.02 to 1,000 Pa.s, (B) 0.1 to 20 weight parts alkoxysilane with the following general formula or partial hydrolysis condensate thereof $$R^1_a Si(OR^2)_{(4-a)}$$

$R^1$ is a monovalent hydrocarbon group; $R^2$ is a monovalent hydrocarbon group or an alkoxy-substituted monovalent hydrocarbon group; and a is zero, 1, or 2, (C) 0.01 to 20 weight parts condensation-reaction catalyst, and (D) 1 to 1,000 weight parts thickening material, present in the components as described above and derived from an addition reaction-crosslinking organopolysiloxane composition or a free radical reaction-crosslinking organopolysiloxane composition.

The present invention also relates to a method for the preparation of the room-temperature-curable organopolysiloxane composition comprising preparing the composition described as follows and inducing thickening by an addition reaction of component (D') in the absence of moisture:

(A) 100 weight parts organopolysiloxane that contains at least 2 silicon-bonded alkoxy groups in each molecule and that has a viscosity at 25° C. of 0.02 to 1,000 Pa.s;

(B) 0.1 to 20 weight parts alkoxysilane with the following general formula or partial hydrolysis condensate thereof $$R^1_a Si(OR^2)_{(4-a)}$$

$R^1$ is a monovalent hydrocarbon group; $R^2$ is a monovalent hydrocarbon group or an alkoxy-substituted monovalent hydrocarbon group; and a is zero, 1, or 2;

(C) 0.01 to 20 weight parts condensation-reaction catalyst; and (D') 1 to 1,000 weight parts addition reaction-crosslinking organopolysiloxane composition comprising the following components (a) through (c)
  (a) 100 weight parts organopolysiloxane that contains at least 2 alkenyl groups in each molecule,
  (b) 0.5 to 50 weight parts organopolysiloxane that contains at least 2 silicon-bonded hydrogen atoms in each molecule, and
  (c) a catalytic quantity of a hydrosilylation-reaction catalyst.

This invention also relates to a method for the preparation of the room-temperature-curable organopolysiloxane composition, comprising preparing the composition described as follows and inducing thickening by a free radical reaction of component (D'') in the absence of moisture:

(A) 100 weight parts organopolysiloxane that contains at least 2 silicon-bonded alkoxy groups in each molecule and that has a viscosity at 25° C. of 0.02 to 1,000 Pa.s;

(B) 0.1 to 20 weight parts alkoxysilane with the following general formula or partial hydrolysis condensate thereof $$R^1_a Si(OR^2)_{(4-a)}$$

$R^1$ is a monovalent hydrocarbon group; $R^2$ is a monovalent hydrocarbon group or alkoxy-substituted hydrocarbon group; and a is zero, 1, or 2;

(C) 0.01 to 20 weight parts condensation-reaction catalyst; and (D'') 1 to 1,000 weight parts free radical reaction-crosslinking organopolysiloxane composition comprising the following components (d) and (e)
  (d) 100 weight parts organopolysiloxane and
  (e) 0.01 to 100 weight parts organoperoxide.

DETAILED DESCRIPTION OF THE PREFERRED EMBODIMENTS

Component (A) is an organopolysiloxane that contains at least 2 silicon-bonded alkoxy groups in each molecule. The silicon-bonded alkoxy groups in component (A) are exemplified by methoxy, ethoxy, propoxy, and butoxy. Methoxy is preferred because it affords an excellent curability. The silicon-bonded alkoxy groups on the organopolysiloxane in component (A), can be at the molecular chain terminals or at non-terminal positions. Bonding at the molecular chain terminals is preferred because this affords an excellent curability. The molecular structure of component (A) can be linear, cyclic, branched, network, resin, or partially branched straight chain. Component (A) preferably takes the form of a linear polydiorganosiloxane with the following general formula.

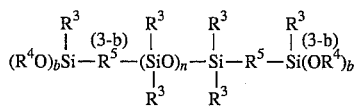

$R^3$ in the preceding formula is a monovalent hydrocarbon group, exemplified by alkyl groups such as methyl, ethyl, propyl, butyl, pentyl, hexyl, heptyl, octyl, decyl, and octadecyl; cycloalkyl groups such cyclopentyl and cyclohexyl; alkenyl groups such as vinyl, allyl, butenyl, pentenyl, and hexenyl; aryl groups such as phenyl, tolyl, xylyl, and naphthyl; aralkyl groups such as benzyl, phenethyl, and phenylpropyl; and halogen-substituted monovalent hydrocarbon groups such as 3-chloropropyl, 3,3,3-trifluoropropyl, and chlorophenyl.

$R^4$ in the preceding formula is an alkyl group, and is exemplified by methyl, ethyl, propyl, butyl, pentyl, hexyl, heptyl, octyl, decyl, and octadecyl. $R^5$ in the preceding formula is an oxygen atom or a divalent hydrocarbon group. The divalent hydrocarbon group, $R^5$, is exemplified by alkylene groups such as methylmethylene, ethylene, propylene, butylene, and hexylene, and by arylalkylene groups such as phenylethylene and phenylpropylene.

The subscript b in the preceding formula has a value of at least 1. A value of 2 or 3 is preferred for b. The subscript n in the preceding formula is a positive number that yields a component (A) viscosity of 0.02 to 1,000 Pa.s at 25° C. with a preferred viscosity of 0.1 to 500 Pa.s. The physical properties (flexibility and elongation) of the final silicone rubber are sharply reduced when the viscosity of component (A) falls below 0.02 Pa.s. On the other hand, the processing characteristics (workability) of the resulting composition are very poor when the viscosity of component (A) exceeds 1,000 Pa.s.

Component (B) of the inventive composition functions as a crosslinker, and is an alkoxysilane with the general formula $$R^1_a Si(OR^2)_{(4-a)}$$

or the partial hydrolysis condensate thereof. $R^1$ is a monovalent hydrocarbon group as exemplified above for $R^3$. $R^2$ is a monovalent hydrocarbon group or alkoxy-substituted hydrocarbon group. The monovalent hydrocarbon groups and halogen-substituted monovalent hydrocarbon groups of $R^2$ are exemplified by those described above for $R^3$. The alkoxy-substituted monovalent hydrocarbon groups of $R^2$ are exemplified by methoxyethyl, ethoxyethyl, methoxypropyl, and methoxybutyl. The subscript a in the preceding formula has a value of zero, 1, or 2. Component (B) is a tetrafunctional alkoxysilane when a=0, a tri-functional alkoxysilane when a=1, and a difunctional alkoxysilane when a=2. Partial hydrolyzates of the any of the above alkoxysilanes are also included within the scope of this invention.

Component (B) is exemplified by tetrafunctional alkoxysilanes such as tetramethoxysilane, tetraethoxysilane, and methyl Cellosolve orthosilicate; trifunctional alkoxysilanes such as methyltrimethoxysilane, methyltriethoxysilane, ethyltrimethoxysilane, vinyltrimethoxysilane, phenyltrimethoxysilane, and methyltri(methoxyethoxy)silane; difunctional alkoxysilanes such as dimethyldimethoxysilane and diphenyldimethoxysilane; alkenyloxysilanes such as methyltrivinyloxysilane, methyltri(isopropenyloxy)silane, vinyltri(isopropenyloxy)silane, phenyltri(isopropenyloxy)silane, and tetra(isopropenyloxy)silane; and by the partial hydrolysis condensates of the preceding. These alkoxysilanes may be used singly or as mixtures of two or more selections.

Component (B) is present in the composition at 0.1 to 20 weight parts per 100 weight parts component (A) and preferably at 1 to 10 weight parts per 100 weight parts component (A). The storage stability of the resulting composition is sharply reduced at less than 0.1 weight parts component (B) per 100 weight parts component (A), while the curability of the resulting composition is sharply reduced at more than 20 weight parts.

Component (C) in the inventive composition is a condensation-reaction catalyst that accelerates a curing reaction.

Component (C) is exemplified by organotin compounds such as di-n-butyltin dilaurate, di-n-butyltin dioctoate, and stannous octoate; organotitanate esters such as tetra-n-butyl titanate and tetraisopropyl titanate; organotitanium complexes such as diisopropoxybis(acetylacetone)titanium and diisopropoxy-bis(ethyl acetoacetate)titanium; and the salts of organic acids with tin, titanium, zirconium, iron, antimony, bismuth, and manganese.

Component (C) is present in the inventive composition at 0.01 to 20 weight parts per 100 weight parts component (A) and preferably at 0.1 to 5 weight parts per 100 weight parts component (A). The curability of the resulting composition is sharply reduced at less than 0.01 weight parts component (C) per 100 weight parts component (A), while the storage stability of the resulting composition is sharply reduced at more than 20 weight parts.

Component (D) in the inventive composition is the component that imparts tack to the composition during its cure (cure-time tack). It comprises a material that thickens the composition of components (A)–(C), i.e. a thickening material, and preferably is in component (A) or in components (A) and (B), and that is derived from an addition reaction-crosslinking organopolysiloxane composition or a free radical reaction-crosslinking organopolysiloxane composition. The addition reaction-crosslinking organopolysiloxane composition and free radical reaction-crosslinking organopolysiloxane composition are the respective precursors for component (D), these are compositions that thicken and form a gum, gel, or rubber when crosslinked by themselves. The resulting invention organopolysiloxane composition of (A), (B), (C), and (D), however, exhibits only thickening, without gelation or rubber formation, when the addition reaction-crosslinking organopolysiloxane composition is addition-reacted or the free radical reaction-crosslinking organopolysiloxane composition is free radical-reacted in components (A)–(C) and preferably in component (A) or in components (A) and (B). In addition, a unique effect provided by component (D) is that it imparts tack to the inventive composition during the composition's cure while the resulting cured product exhibits almost no tack.

The addition reaction-crosslinking organopolysiloxane composition and the free radical reaction-crosslinking organopolysiloxane composition comprising component (D) precursors for the invention composition, can be any known composition. These compositions are exemplified by addition reaction-crosslinking organopolysiloxane compositions comprising organopolysiloxane having at least 2 alkenyl groups in each molecule, organopolysiloxane having at least 2 Si-bonded hydrogen atoms in each molecule, and hydrosilylation-reaction catalyst; and by free radical reaction-crosslinking organopolysiloxane compositions comprising organopolysiloxane and organoperoxide. Through the thickening that is caused when these compositions are crosslinked by addition reaction or free radical reaction in compositions of components (A)–(C) and preferably in component (A) or components (A) and (B), tack is imparted to the inventive composition during its cure without degrading the processing characteristics.

Component (D) is present in the inventive composition at 1 to 1,000 weight parts per 100 weight parts component (A) and preferably at 5 to 500 weight parts. Cure-time tack cannot be imparted to the composition at a component (D) addition below 1 weight part per 100 weight parts component (A). An addition in excess of 1,000 weight parts causes a sharp decline in the processing and curing characteristics of the resulting composition. When a rubber would be obtained by the addition reaction-crosslinking or free radical reaction-crosslinking, respectively, of the component (D) precursor by itself, i.e. the addition reaction-crosslinking organopolysiloxane composition or the free radical reaction-crosslinking organopolysiloxane composition, the addition of component (D) is preferably reduced as appropriate in order to avoid causing a deterioration in the processing characteristics of the inventive composition.

The inventive composition comprises a homogeneous dispersion of components (A) to (D) as described above, and it can be a single-package or two-package room-temperature-curable organopolysiloxane composition or as a room-temperature-curable organopolysiloxane composition divided up into an even larger number of fractions. Other than components (A) to (D), operable optional components for the inventive composition are exemplified by tackifiers such as natural resins, rosin ester resins, terpene resins, phenolic resins, styrene resins, xylene resins, and petroleum resins; inorganic fillers such as dry-process silica, wet-process silica, quartz micropowder, calcium carbonate, titanium dioxide, diatomaceous earth, aluminum oxide, aluminum hydroxide, zinc oxide, and zinc carbonate; inorganic fillers obtained by treating the surfaces of the preceding inorganic fillers with a treatment agent such as a silane, silazane, polysiloxane with low degree of polymerization, and organic compound; hydroxyl group scavengers, for the purpose of improving the storage stability when the invention composition is formulated as a single-package room-temperature-curable organopolysiloxane composition; organic solvents such as toluene, xylene, heptane, and hexane; unreactive trimethyl-siloxy-endblocked diorganopolysiloxane, for the purpose of reducing the hardness of the cured product or improving the surface properties of the cured product; and by such additives as flame retardants, heat stabilizers, plasticizers, thixotropy agents, adhesion promoters, cure accelerators, antimolds, and pigments.

The inventive composition can be prepared by first preparing a composition of (A), (B), (C), and (D') 1 to 1,000 weight parts addition reaction-crosslinking organopolysiloxane composition comprising the following components (a) through (c), where (a) 100 weight parts organopolysiloxane that contains at least 2 alkenyl groups in each molecule, (b) 0.5 to 50 weight parts organopolysiloxane that contains at least 2 silicon-bonded hydrogen atoms in each molecule, and (c) a catalytic quantity of a hydrosilylation-reaction catalyst; and by then inducing thickening by the addition reaction of component (D') in the absence of moisture. The invention composition can also be prepared by preparing the same composition as above, but replacing component (D') with (D") 1 to 1,000 weight parts free radical reaction-crosslinking organopolysiloxane composition comprising the following components (d) and (e) where (d) 100 weight parts organopolysiloxane and (e) 0.01 to 100 weight parts organoperoxide. In this case, thickening is then induced by the free radical reaction of component (D") in the absence of moisture.

The components (A), (B), and (C) in the preparative method of the invention remain the same as described above.

The component (D') in the preparative method of the invention is an addition reaction-crosslinking organopolysiloxane composition which, when addition reaction-crosslinked by itself, undergoes thickening to form a gum, gel, or rubber. Component (D') comprises compositions in which crosslinking proceeds by addition reaction at room temperature or with heating.

Component (a) of component (D') is an organopolysiloxane that contains at least 2 alkenyl groups in each molecule. When component (a) contains fewer than 2 alkenyl groups, component (D') does not thicken and does not impart cure-time tack to the invention composition. The molecular structure of component (a) can be, for example, linear, cyclic, branched, network, resin, or partially branched straight chain. Component (a) may be a homopolymer, copolymer, or mixture thereof. The molecular chain terminal groups in component (a) are exemplified by triorganosiloxy groups such as trimethyl-siloxy, dimethylvinylsiloxy, dimethylphenylsiloxy, and methylvinylphenylsiloxy; the hydroxyl group; and alkoxy groups.

Component (a) can be a liquid with a viscosity at 25° C. of 0.05 Pa.s to a high-viscosity gum or a solid. A satisfactory tack cannot be imparted to the final composition when component (a) has a viscosity at 25° C. lower than 0.05 Pa.s, therefore component (a) has a viscosity at 25° C. of at least 0.05 Pa.s.

The alkenyl group in component (a) is exemplified by vinyl, allyl, butenyl, pentenyl, hexenyl, and heptenyl. Vinyl is preferred for its excellent reactivity. The alkenyl group can be bonded at the molecular chain terminal or non-terminal position. However, the alkenyl group is preferably bonded at least at the molecular chain terminals because this provides an excellent alkenyl reactivity. Other than the alkenyl group, the silicon-bonded organic groups in component (a) can be non-alkenyl monovalent hydrocarbon groups. These monovalent hydrocarbon groups and halogen-substituted monovalent hydrocarbon groups are exemplified above for $R^3$. The nature of the silicon-bonded organic groups in component (a), the nature of its molecular chain terminal groups, its viscosity, should be selected as appropriate to the intended application of the final composition.

The organopolysiloxane comprising the component (b) in component (D') functions as a crosslinker. It is an organopolysiloxane whose molecule contains at least 2 silicon-bonded hydrogen atoms for addition across the alkenyl groups in component (a). The molecular structure of component (b) can be chain, cyclic, branched, network, resin, or partially branched straight chain. Component (b) may be a homopolymer, copolymer, or mixture thereof. The viscosity at 25° C. of component (b) preferably falls in the range of 0.001 to 10 Pa.s.

The silicon-bonded organic groups in component (b) are exemplified by non-alkenyl monovalent hydrocarbon groups. The silicon-bonded organic groups in component (b) are exemplified by alkyl groups such as methyl, ethyl, propyl, butyl, pentyl, hexyl, heptyl, octyl, decyl, and octadecyl; cycloalkyl groups such as cyclopentyl and cyclohexyl; aryl groups such as phenyl, tolyl, xylyl, and naphthyl; aralkyl groups such as benzyl, phenethyl, and phenylpropyl; and halogen-substituted monovalent hydrocarbon groups such as 3-chloropropyl, 3,3,3-trifluoro-propyl, and chlorophenyl.

Component (b) is preferably added to component (D') in a quantity sufficient to provide 0.3 to 5 silicon-bonded hydrogen atoms in component (b) per silicon-bonded alkenyl group in component (a). In order to achieve this, it will generally be necessary to have 0.3 to 40 weight parts component (b) per 100 weight parts component (a).

The hydrosilylation-reaction catalyst comprising the component (c) in component (D') is a catalyst that accelerates the addition reaction between the alkenyl groups in component (a) and the silicon-bonded hydrogen atoms in component (b). The known hydrosilylation-reaction catalysts can be used as component (c), but platinum compounds are ordinarily used as component (c). The platinum compounds of (c) are exemplified by microparticulate elemental platinum, very finely divided platinum dispersed on carbon powder, chloroplatinic acid, chloroplatinic acid/olefin coordination compounds, and chloro-platinic acid/vinylsiloxane coordination compounds. Non-platinum compounds are exemplified by tetrakis(triphenylphosphine)palladium and rhodium compounds. Component (c) is added to component (D') in a catalytic quantity, and specifically in the range of 0.1 to 1,000 weight parts as metal in component (c) per 1,000,000 weight parts component (a) and preferably at 0.5 to 200 weight parts as metal in component (c) per 1,000,000 weight parts component (a).

Component (D') is comprised of the components (a)–(c) as described above. Operable optional components are pigments, dyes, and addition-reaction inhibitors. The addition-reaction inhibitor is used to control or modulate the crosslinking rate in the addition reaction of component (D') and thereby gain working time in the preparative method of the invention for the preparation of a homogeneous composition from components (A)–(D').

In the preparative method of the invention, the component (D') comprised of the above-described components (a)–(c) is first mixed to homogeneity into components (A)–(C) and preferably into component (A) or components (A) and (B). Thickening is then carried out by the addition reaction-based crosslinking of (D'). Heating is not absolutely required since the addition reaction-based crosslinking of component (D') proceeds even at room temperature. However, heating is preferred in order to rapidly crosslink and thicken the composition by the addition reaction of (D'). The heating temperature is a temperature sufficient to induce the thickening of the composition by crosslinking of component (D') upon heating. For example, a preferred heating temperature range is 40° C. to 200° C. and a particularly preferred range is 80° C. to 150° C.

Component (D'') can be used in place of component (D') in the preparative method in accordance with the present invention. Component (D'') is a free radical reaction-crosslinking organopolysiloxane composition. When component (D'') is free radical reaction-crosslinked by itself, it thickens and forms a gum, gel, or rubber. The free radical reaction that crosslinks component (D'') does not proceed to a significant degree at room temperature and is therefore generally run by heating.

The component (d) in component (D'') is an organopolysiloxane. The molecular structure of component (d) can be, for example, linear, cyclic, branched, network, resin, or partially branched straight chain. Component (d) may be a homopolymer, copolymer, or mixture thereof.

Component (d) can be a liquid with a viscosity at 25° C. of 0.05 Pa.s to a high-viscosity gum or a solid. A satisfactory tack cannot be imparted to the final composition when component (d) has a viscosity at 25° C. lower than 0.05 Pa.s, therefore component (d) has a viscosity at 25° C. of at least 0.05 Pa.s.

The silicon-bonded groups in component (d) are exemplified by those groups described above for $R^3$. The molecular chain terminals of component (d) are exemplified by triorganosiloxy groups such as trimethylsiloxy, dimethylvinylsiloxy, dimethylphenylsiloxy, and methylvinylphenylsiloxy; the hydroxyl group; and alkoxy groups. The nature of the silicon-bonded organic groups in component (d), the nature of its molecular chain terminal groups, and its viscosity, should be selected as appropriate to the intended application of the final composition.

The organoperoxide of component (e) in component (D'') is the component that brings about thickening by the free radical reaction-based crosslinking of component (D''). The organoperoxide of component (e) is exemplified by benzoyl peroxide, dicumyl peroxide, 2,4-dichlorobenzoyl peroxide, 2,5-dimethyl-2,5-di(tert-butylperoxy)hexane, and di-tert-butyl peroxide. While organoperoxides such as 2,4-dichlorobenzoyl peroxide, do not require the presence of alkenyl in component (d), the presence of alkenyl in component (d) is essential for organoperoxides such as 2,5-dimethyl-2,5-di(tert-butylperoxy)hexane.

Component (e) is added to component (D") in the range of 0.01 to 100 weight parts per 100 weight parts component (d) and preferably in the range of 0.1 to 10 weight parts per 100 weight parts component (d). Component (D") cannot be crosslinked and a satisfactory thickening therefore cannot be obtained when less than 0.01 weight part component (e) is added per 100 weight parts component (d). This in turn prevents the generation of cure-time tack by the composition. The addition of more than 100 weight parts can sharply reduce the processability of the invention composition and can lead to foaming in the resulting composition.

In the preparative method of the invention, the component (D") comprised of the above-described components (d) and (e) is first mixed to homogeneity into components (A)–(C) and preferably into component (A) or components (A) and (B). Thickening is then carried out by the free radical reaction-based crosslinking of (D"). Heating is preferred in order to rapidly crosslink and thicken the composition by the free radical reaction of component (D"). The heating temperature is a temperature sufficient to induce the thickening of the composition through the crosslinking of component (D") upon heating. For example, a preferred heating temperature range is 80° C. to 250° C. and a particularly preferred range is 100° C. to 200° C.

The preparative method of the invention can also be implemented by first crosslinking component (D') or (D") in component (A) or components (A) plus (B) and then adding component (C) to the resulting system. This method offers the advantage of avoiding inhibition by component (C) of the addition reaction or free radical reaction by which component (D) is synthesized, particularly when a tin-based condensation-reaction catalyst has been used as component (C).

Because the room-temperature-curable organopolysiloxane composition of the invention exhibits tack during its cure, it can by virtue of its tack strength hold substrate with which it may be in contact. It can, as a result, withstand movement or other handling of the bonded assembly and thereby suppresses deviations or aberrations in the bonding position and suppresses adherend delamination. This makes possible a high-quality bonding of adherends by the cured product. In order to obtain maximum development of the cure-time tack strength of the invention composition and the adhesive strength of the cured product, the adherend is preferably applied when the composition's cure-time tack strength is at a maximum. As a result, it will in general be preferable to apply the adherend to the invention composition just before the surface of the invention composition cures (tack-free time).

The room-temperature-curable organopolysiloxane composition of the present invention can also be used as a temporary or emergency fastener by virtue of its development of tack during its cure. In addition, it provides a sharp reduction in the setting time and forms a cured product strongly adherent to a variety of substrates when cured while in contact with substrate. For these reasons it is useful as an adhesive, sealant, or coating in construction and industry, for electrical and electronic devices and instruments, and so forth.

The present invention is explained in greater detail through working examples. In the examples, the values reported for viscosity were measured at 25° C. and "part" and "parts" represents "weight part" and "weight parts" respectively.

EXAMPLE 1

The following were first mixed to homogeneity: 50 parts trimethoxysiloxy-endblocked dimethylpolysiloxane with a viscosity of 15 Pa.s, 50 parts trimethoxysiloxy-endblocked dimethylpolysiloxane with a viscosity of 5 Pa.s, 75 parts dimethylvinylsiloxy-endblocked dimethylpolysiloxane with a viscosity of 0.4 Pa.s, and 25 parts copolymer composed of the $SiO_2$ unit, $(CH_3)_3SiO_{1/2}$ unit, and $(CH_3)_2(CH_2=CH)SiO_{1/2}$ unit (viscosity=7 Pa.s, 1 weight % content of Si-bonded vinyl in the copolymer). This was followed by the addition with mixing to homogeneity in the absence of moisture of 10 parts dry-process silica (BET specific surface=200 $m^2/g$, surface-treated with hexamethyldisilazane), 16 parts dimethylhydrogensiloxy endblocked dimethylpolysiloxane (viscosity=0.01Pa.s), isopropanolic chloroplatinic acid solution (chloroplatinic acid added in a quantity sufficient to provide 10 ppm platinum metal based on the total quantity of the copolymer and dimethylvinylsiloxy-endblocked dimethylpolysiloxane), 2 parts methyltrimethoxysilane, and 2 parts diisopropoxybis(ethyl acetoacetate)titanium. The resulting mixture was heated for 60 minutes in a 100° C. hot-air circulation oven to yield a room-temperature-curable organopolysiloxane composition in accordance with the present invention.

This composition was uniformly coated to a thickness of 100 micrometers on polyethylene terephthalate (PET) film (thickness=0.3 mm). After standing for 15 minutes at 20° C., PET film was then pasted onto the surface of the composition. The tack strength immediately after contacting the PET film with the surface of the composition and the adhesive strength after standing for 7 days at room temperature were determined by measuring the 180° peel strength between the films. These results were as reported in Table 1.

Comparison Example 1

The following were combined and mixed to homogeneity in the absence of moisture: 50 parts trimethoxysiloxy-endblocked dimethylpolysiloxane with a viscosity of 15 Pa.s, 50 parts trimethoxysiloxy-endblocked dimethylpolysiloxane with a viscosity of 5 Pa.s, 10 parts dry-process silica (BET specific surface=200 $m^2/g$, surface-treated with hexamethyldisilazane), 2 parts methyltrimethoxysilane, and 2 parts diisopropoxybis-(ethyl acetoacetate)titanium. The resulting mixture was heated for 60 minutes in a 100° C. hot-air circulation oven to yield a room-temperature-curable organopolysiloxane composition.

This composition was uniformly coated to a thickness of 100 micrometers on polyethylene terephthalate (PET) film (thickness=0.3 mm). After standing for 15 minutes at 20° C., PET film was then pasted onto the surface of the composition. The tack strength immediately after contacting the PET film with the surface of the composition and the adhesive strength after standing for 7 days at room temperature were determined by measuring the 180° peel strength between the films. These results were as reported in Table 1.

Comparison Example 2

The following were combined and mixed to homogeneity in the absence of moisture: 75 parts dimethylvinylsiloxy endblocked dimethylpolysiloxane with a viscosity of 0.4 Pa.s; 25 parts copolymer composed of the $SiO_2$ unit, $(CH_3)_3SiO_{1/2}$ unit, and $(CH_3)_2(CH_2=CH)SiO_{1/2}$ unit (viscosity=7 Pa.s, 1 weight % content of Si-bonded vinyl in the copolymer); 10 parts dry-process silica (BET specific surface=200 m$^2$/g, surface-treated with hexamethyldisilazane); 16 parts dimethylhydrogensiloxy-endblocked dimethylpolysiloxane (viscosity=0.01 Pa.s); and isopropanolic chloroplatinic acid solution (chloroplatinic acid added in a quantity sufficient to provide 10 ppm platinum metal based on the total quantity of the copolymer and dimethylvinyl-siloxy-endblocked dimethylpolysiloxane). Gelation occurred when the resulting mixture was heated for 60 minutes in a 100° C. hot-air circulation oven.

TABLE 1

|  | EXAMPLE 1 | COMPARISON EXAMPLE 1 |
|---|---|---|
| Tack strength immediately after contact, gf/25 mm | 200 | 10 |
| Adhesive strength after 7 days at room temperature, gf/25 mm | 1100 | 1500 |

EXAMPLE 2

A liquid mixture was first prepared by mixing the following to homogeneity: 100 parts trimethoxysiloxy-endblocked dimethylpolysiloxane with a viscosity of 15 Pa.s; 45 parts dimethylvinylsiloxy-endblocked dimethylpolysiloxane with a viscosity of 0.4 Pa.s; 15 parts copolymer composed of the $SiO_2$ unit, $(CH_3)_3SiO_{1/2}$ unit, and $(CH_3)_2(CH_2=CH)SiO_{1/2}$ unit (viscosity=7 Pa.s, 1 weight % content of Si-bonded vinyl in the copolymer); and 50 parts dimethylvinylsiloxy endblocked dimethylpolysiloxane with a viscosity of 2 Pa.s. The following were then added to this liquid mixture with mixing to homogen-eity: 10 parts dry-process silica with a BET specific surface of 200 m$^2$/g (surface-treated with hexa-methyldisilazane), 10 parts dimethylhydrogensiloxy-endblocked dimethylpolysiloxane with a viscosity of 0.01 Pa.s), and isopropanolic chloroplatinic acid solution (chloroplatinic acid added in a quantity sufficient to provide 10 ppm platinum metal based on the total quantity of the copolymer and dimethylvinylsiloxy-endblocked dimethylpolysiloxane). The resulting composition was heated for 120 minutes in an 80° C. hot-air circulation oven. 3 parts methyltrimethoxysilane and 0.5 part dibutyltin dilaurate were then added to the composition with mixing to homogeneity in the absence of moisture to yield a room-temperature-curable organopolysiloxane composition in accordance with the present invention.

This composition was uniformly coated to a thickness of 50 micrometers on a polyethylene terephthalate (PET) film (thickness=0.3 mm). After standing for 15 minutes at 20° C., PET film was then pasted onto the surface of the composition. The tack strength immediately after contacting the PET film with the surface of the composition and the adhesive strength after standing for 7 days at room temperature were determined by measuring the 180° peel strength between the films. These results were as reported in Table 2.

EXAMPLE 3

The following were combined and mixed to homogeneity in the absence of moisture: 100 parts methyldimethoxysiloxy-endblocked dimethylpolysiloxane with a viscosity of 12 Pa.s, 20 parts trimethylsiloxy-endblocked dimethylpolysiloxane with a viscosity of 3 Pa.s, 30 parts quartz micropowder, 1 part 2,4-dichlorobenzoyl peroxide, 1 part vinyltrimethoxysilane, and 0.2 part diiso-propoxybis(ethyl acetoacetate)titanium. The resulting mixture was heated for 60 minutes in a 110° C. hot-air circulation oven to yield a room-temperature-curable organopolysiloxane composition in accordance with the present invention.

This composition was uniformly coated to a thickness of 100 micrometers on polyethylene terephthalate (PET) film (thickness=0.3 mm). After standing for 15 minutes at 20° C., PET film was then pasted onto the surface of the composition. The tack strength immediately after contacting the PET film with the surface of the composition and the adhesive strength after standing for 7 days at room temperature were determined by measuring the 180° peel strength between the films. These results were as reported in Table 2.

TABLE 2

|  | Example 2 | Example 3 |
|---|---|---|
| Tack strength immediately after contact, gf/25 mm | 120 | 180 |
| Adhesive strength after 7 days at room temperature, gf/25 mm | 1000 | 1400 |

EXAMPLE 4

A liquid mixture was first prepared by mixing the following to homogeneity: 100 parts trimethoxysiloxy-endblocked dimethylpolysiloxane with a viscosity of 5 Pa.s and 10 parts copolymer composed of the $SiO_2$ unit, $(CH_3)_3SiO_{1/2}$ unit, and $(CH_3)_2(CH_2=CH)SiO_{1/2}$ unit (viscosity=7 Pa.s, 1 weight % content of Si-bonded vinyl in the copolymer). The following were then added to this liquid mixture with mixing to homogeneity in the absence of moisture: 15 parts dry-process silica with a BET specific surface of 110 m$^2$/g (surface-treated with dimethyldichlorosilane), 0.5 part trimethylsiloxy-endblocked dimethylsiloxane-methylhydrogensiloxane copolymer (viscosity=0.01 Pa.s, content of silicon-bonded hydrogen in the copolymer=0.7 weight %), isopropanolic chloroplatinic acid solution (chloroplatinic acid added in a quantity sufficient to provide 10 ppm platinum metal based on the quantity of the former copolymer), 4 parts methyltrimethoxysilane, and 1 part diisopropoxybis(ethyl acetoacetate)titanium. This mixture was then heated for 60 minutes in a 100° C. hot-air circulation oven to afford a room-temperature-curable organopolysiloxane composition in accordance with the present invention.

This composition had a surface cure time at 20° C. of 20 minutes as measured by the method of JIS A 5758.

This composition was uniformly coated to a thickness of 200 micrometers on aluminum panels, which were then allowed to stand at 20° C. for 10 minutes, 20 minutes, 30 minutes, or 60 minutes. This was followed by the application of aluminum panels not coated with the composition. The resulting test specimens were tested for their tack strength immediately after assembly and for their adhesive strength after standing for 7 days at room temperature. These results are reported in Table 3.

Comparison Example 3

The following were combined and mixed to homogeneity in the absence of moisture: 100 parts trimethoxysiloxy-endblocked dimethylpolysiloxane with a viscosity of 5 Pa.s, 15 parts dry-process silica with a BET specific surface of 110 m$^2$/g (surface-treated with dimethyldichlorosilane), 4 parts methyltrimethoxysilane, and 1 part diisopropoxy-bis-(ethyl acetoacetate)titanium. This mixture was heated for 60 minutes in a 100° C. hot-air circulation oven to give a room-temperature-curable organopolysiloxane composition.

This composition had a surface cure time at 20° C. of 15 minutes as measured by the method of JIS A 5758.

This composition was uniformly coated to a thickness of 200 micrometers on aluminum panels, which were then allowed to stand at 20° C. for 10 minutes, 20 minutes, 30 minutes, or 60 minutes. This was followed by the application of aluminum panels not coated with the composition. The resulting test specimens were tested for their tack strength immediately after assembly and for their adhesive strength after standing for 7 days at room temperature. These results are reported in Table 3.

TABLE 3

|  | EXAMPLE 4 | COMPARISON EXAMPLE 3 |
|---|---|---|
| Surface cure time, min | 20 | 15 |
| Tack strength immediately after assembly, kgf/5 cm Standing time, | | |
| 10 min | 0.9 | 0.5 |
| 20 min | 3.5 | 1.2 |
| 30 min | 5.0 | 0.6 |
| 60 min | 2.8 | 0.5 |
| Adhesive strength after 7 days at room temperature, kgf/5 cm Standing time, | | |
| 10 min | 80 | 85 |
| 20 min | 70 | 65 |
| 30 min | 65 | 5 |
| 60 min | 15 | 1 |

EFFECTS OF THE INVENTION

The room-temperature-curable organopolysiloxane composition in accordance with the present invention is characterized by the ability to exhibit tack during the course of its cure and by the ability to form a cured product strongly adherent to a variety of substrates when cured while in contact with substrate. The preparative method in accordance with the present invention is characterized by the ability to prepare the aforesaid room-temperature-curable organopolysiloxane composition.

That which is claimed is:

1. A room-temperature-curable organopolysiloxane composition comprising (A) 100 weight parts organopolysiloxane that contains at least 2 silicon-bonded alkoxy groups in each molecule and that has a viscosity at 25° C. of 0.02 to 1,000 Pa.s, (B) 0.1 to 20 weight parts, per 100 weight parts of (A), alkoxysilane with the following general formula or partial hydrolysis condensate thereof $$R^1{}_a Si(OR^2)_{(4-a)}$$

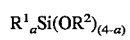

$R^1$ is a monovalent hydrocarbon group; $R^2$ is a monovalent hydrocarbon group or an alkoxy-substituted monovalent hydrocarbon group; and a is zero, 1, or 2, (C) 0.01 to 20 weight parts, per 100 weight parts of (A), condensation-reaction catalyst, and (D) 1 to 1,000 weight parts, per 100 weight parts of (A), thickening material comprising an addition reaction-crosslinking organopolysiloxane composition or a free radical reaction-crosslinking organopolysiloxane composition wherein component (D) exhibits thickening without gelation or rubber formation upon heating said room temperature curable composition.

2. The room-temperature-curable organopolysiloxane composition in accordance with claim 1 in which the thickening material of (D) is an addition reaction-crosslinking organopolysiloxane composition comprising the following components (a) through (c)

(a) 100 weight parts organopolysiloxane that contains at least 2 alkenyl groups in each molecule, (b) 0.5 to 50 weight parts, per 100 weight parts of (a), organopolysiloxane that contains at least 2 silicon-bonded hydrogen atoms in each molecule, and (c) a catalytic quantity of a hydrosilylation-reaction catalyst.

3. The room-temperature-curable organopolysiloxane composition in accordance with claim 1 in which the thickening material of (D) is a free radical reaction-crosslinking organopolysiloxane composition comprising the following components (d) and (e), (d) 100 weight parts organopolysiloxane and (e) 0.01 to 100 weight parts organoperoxide per 100 weight parts of (d).

4. The room-temperature-curable organopolysiloxane composition in accordance with claim 1 in which (B) is present in an amount of from 1 to 10 weight parts per 100 weight parts of (A), (C) is present in an amount of from 0.1 to 5 weight parts per 100 weight parts of (A), and (D) is present in an amount of from 5 to 500 weight parts per 100 weight parts of (A).

5. The room-temperature-curable organopolysiloxane composition in accordance with claim 1 in which the alkoxy groups in (A) are methoxy and $R^2$ is methyl.

6. The room-temperature-curable organopolysiloxane composition in accordance with claim 5 in which (B) is present in an amount of from 1 to 10 weight parts per 100 weight parts of (A), (C) is present in an amount of from 0.1 to 5 weight parts per 100 weight parts of (A), and (D) is present in an amount of from 5 to 500 weight parts per 100 weight parts of (A).

7. The room-temperature-curable organopolysiloxane composition in accordance with claim 1 in which the organopolysiloxane of (A) has a general formula

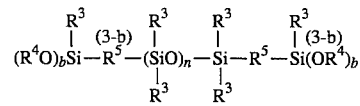

where $R^3$ is a monovalent hydrocarbon group or a halogen-substituted monovalent hydrocarbon groups; $R^4$ is an alkyl group; $R^5$ is an oxygen atom or a divalent hydrocarbon group b has a value of at least 1; n is a positive number that yields a component (A) viscosity of 0.02 to 1,000 Pa.s at 25° C.

8. The room-temperature-curable organopolysiloxane composition in accordance with claim 7 in which (B) is present in an amount of from 1 to 10 weight parts per 100 weight parts of (A), (C) is present in an amount of from 0.1 to 5 weight parts per 100 weight parts of (A), and (D) is present in an amount of from 5 to 500 weight parts per 100 weight parts of (A).

9. The room-temperature-curable organopolysiloxane composition in accordance with claim 7 in which $R^4$ is methoxy and $R^2$ is methyl.

10. The room-temperature-curable organopolysiloxane composition in accordance with claim 9 in which (B) is present in an amount of from 1 to 10 weight parts per 100 weight parts of (A), (C) is present in an amount of from 0.1 to 5 weight parts per 100 weight parts of (A), and (D) is present in an amount of from 5 to 500 weight parts per 100 weight parts of (A).

11. A method for the preparation of the room-temperature-curable organopolysiloxane composition comprising preparing the composition described as follows and inducing thickening by the addition reaction of component (D') in the absence of moisture:

(A) 100 weight parts organopolysiloxane that contains at least 2 silicon-bonded alkoxy groups in each molecule and that has a viscosity at 25° C. of 0.02 to 1,000 Pa.s;

(B) 0.1 to 20 weight parts, per 100 weight parts of (A), alkoxysilane with the following general formula or partial hydrolysis condensate thereof $R^1{}_a Si(OR^2)_{(4-a)}$ $R^1$ is a monovalent hydrocarbon group; $R^2$ is a monovalent hydrocarbon group or an alkoxy-substituted monovalent hydrocarbon group; and a is zero, 1, or 2;

(C) 0.01 to 20 weight parts, per 100 weight parts of (A), condensation-reaction catalyst; and (D') 1 to 1,000 weight parts, per 100 weight parts of (A), addition reaction-crosslinking organopolysiloxane composition comprising the following components (a) through (c)
 (a) 100 weight parts organopolysiloxane that contains at least 2 alkenyl groups in each molecule,
 (b) 0.5 to 50 weight parts, per 100 weight parts of (a), organopolysiloxane that contains at least 2 silicon-bonded hydrogen atoms in each molecule, and
 (c) a catalytic quantity of a hydrosilylation-reaction catalyst wherein component (D') exhibits thickening without gelation or rubber formation upon heating said room temperature curable composition.

12. The method according to claim 11 in which the addition reaction to crosslink components (a), (b), and (c) of (D') is at a temperature of from 40° C. to 200° C.

13. The method according to claim 12 in which the temperature is within a range of from 80° C. to 150° C.

14. The method according to claim 11 in which (D') is mixed with (A), reacted, and then (B) and (C) are added.

15. The method according to claim 11 in which (D') is mixed with (A) and (B), reacted, and then (C) is added.

16. A method for the preparation of the room-temperature-curable organopolysiloxane composition, comprising preparing the composition described as follows and inducing thickening by the radical reaction of component (D") in the absence of moisture:

(A) 100 weight parts organopolysiloxane that contains at least 2 silicon-bonded alkoxy groups in each molecule and that has a viscosity at 25° C. of 0.02 to 1,000 Pa.s;

(B) 0.1 to 20 weight parts, per 100 weight parts of (A), alkoxysilane with the following general formula or partial hydrolysis condensate thereof $R^1{}_a Si(OR^2)_{(4-a)}$ $R^1$ is a monovalent hydrocarbon group; $R^2$ is a monovalent hydrocarbon group or alkoxy-substituted hydrocarbon group; and a is zero, 1, or 2;

(C) 0.01 to 20 weight parts, per 100 weight parts of (A), condensation-reaction catalyst; and (D") 1 to 1,000 weight parts, per 100 weight parts of (A), free radical reaction-crosslinking organopolysiloxane composition comprising the following components (d) and (e)
 (d) 100 weight parts organopolysiloxane and
 (e) 0.01 to 100 weight parts organoperoxide per 100 weight parts of (d) wherein component (D") exhibits thickening without gelation or rubber formation upon heating said room temperature curable composition.

17. The method according to claim 16 in which the free radical reaction to crosslink components (d) and (e) of (D") is at a temperature of from 80° C. to 250° C.

18. The method according to claim 17 in which the temperature is within a range of from 100° C. to 200° C.

19. The method according to claim 16 in which (D") is mixed with (A), reacted, and then (B) and (C) are added.

20. The method according to claim 16 in which (D") is mixed with (A) and (B), reacted, and then (C) is added.

* * * * *